Patented Apr. 20, 1954

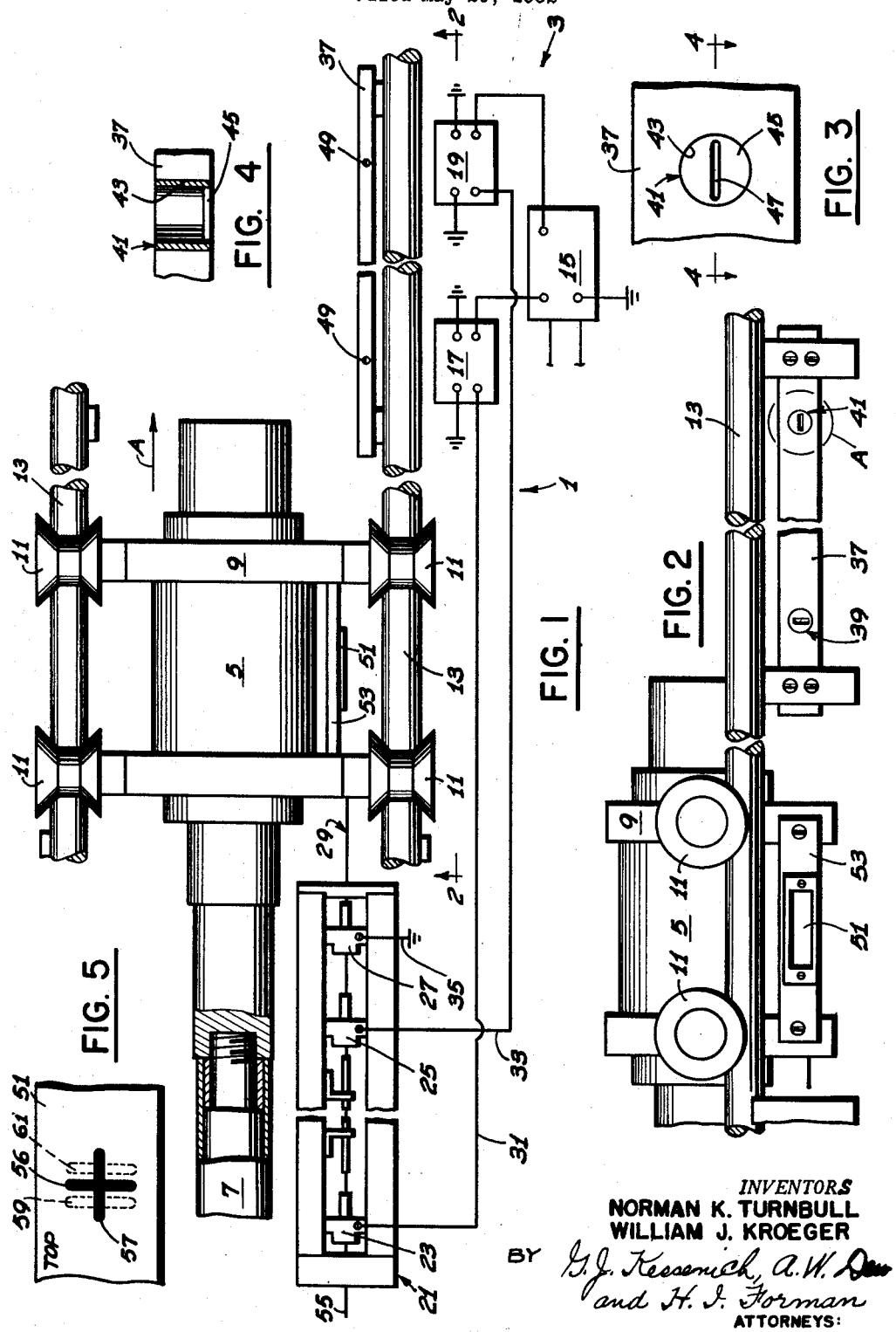

2,675,871

UNITED STATES PATENT OFFICE 2,675,871

VELOCITY MEASURING DEVICE

Norman K. Turnbull, Pitman, N. J., and William J. Kroeger, Philadelphia, Pa.

Application May 20, 1952, Serial No. 288,991

10 Claims. (Cl. 161—18)

(Granted under Title 35, U. S. Code (1952), sec. 266)

The invention described herein may be manufactured and used by or for the Government for governmental purposes without the payment to us of any royalty thereon.

The present invention relates to a velocity measuring device for projectiles, and more particularly to an apparatus for accurately measuring time and distance factors used in determining velocity measurements of projected masses.

In the field of velocity measurement, it has been common practice to employ an electronic chronograph by means of which small intervals of time are recorded on a suitable counter or other time measuring device as the projected mass travels over a limited portion of its trajectory or path, that is, over a reference base line of known length. For most applications, it is sufficient that reasonably close measurement of the length of the reference base line be made. However, for some applications, it is necessary that measurements of time and distance be as accurate as possible. Accuracy in velocity measurements may, for example, be required in testing a safety device for enabling the rapid exit from an aircraft of any of its occupants. An explosive propellant-powered catapult is employed in such a device for safely ejecting the occupant along with the chair or seat on which he is seated. Unless the catapult has a specific velocity or has a velocity which is within a limited range of velocities, the apparatus will not function properly. If the velocity is greater than that required, it will tend to cause the occupant to "black out." However, if the velocity is less than that required, it will either not eject the occupant from the plane or it will not eject him far enough beyond the plane to avoid his being hit by rearward portions of the plane once he is ejected.

It is apparent that any difference in length of the reference base line will affect the net result in determining velocity. For precise measurements, such as those mentioned above, it has been found that differences in the reference base line length of as little as one hundredth of an inch must be considered.

The timing mechanism of the chronograph depends for its operation upon two or more changes in electrical conditions caused by the projectile. For example, the changes in electrical conditions may be occasioned by the projectile interrupting independent electrical circuits at points disposed apart a predetermined distance constituting a reference base line, in a manner well known in the art. It is recognized that the breaking or interrupting of any electrical circuit is not always regular since the break does not always occur at the same point. Inasmuch as the interval of time is measured for the period covering passage of the projectile from the point of interruption of the first circuit to the point of interruption of the second circuit, the precise distance between these two points of interruption must be determined if accurate velocity measurements are to be made.

It is, therefore, a primary object of the present invention to provide an improved electronic chronograph which will enable more accurate velocity measurements of a projectile to be made.

It is a further object of the present invention to provide an electronic chronograph by means of which accurate measurements of both time and distance can be made.

It is also an object of the present invention to provide an electronic chronograph which will automatically and accurately record the time interval and distance factors of a projectile in passing over a limited portion of its trajectory or path.

Another object of the present invention is to provide an electronic chronograph which will take into account minor variations in reference base line measurement occasioned by irregularities in circuit operation.

Still another object of the present invention is to provide an improved electronic chronograph which is simple in construction and operation and which is highly efficient in use for the intended purpose.

In accordance with the present invention, measurements of distance and time intervals are recorded accurately by the use of flash cameras and an electric counter mechanism. The flash cameras comprise two units disposed at spaced intervals along the path of the projected mass and function to produce discrete records on photosensitive record means carried by the mass. The counter mechanism has a plurality of electrical circuits for controlling operation of the recording indicators in a manner well known in the art. Switch means is provided which is operatively connected with the counter mechanism circuits and with the flash cameras in a manner to effect simultaneous operation thereof in response to projection of the mass along its path of movement. This arrangement enables accurate measurements of time and distance to be made in a manner as will be described more fully hereinafter.

The novel features of the present invention, as well as additional objects and advantages thereof, will be better understood from the following detailed description, when read in connection with the accompanying drawing in which:

Fig. 1 is a plan view of a velocity testing apparatus in accordance with the present invention, with parts of the apparatus omitted and with portions of the chronograph being shown schematically and portions of the projectile being shown in section to illustrate details of construction;

Fig. 2 is a side view of a portion of the apparatus shown in Fig. 1, taken along the line 2—2 of Fig. 1;

Fig. 3 is an enlarged view of that portion of the apparatus shown within circle A of Fig. 2;

Fig. 4 is a sectional view of the apparatus shown in Fig. 3, taken along the line 4—4 of Fig. 3; and Fig. 5 is a view of a portion of a photographic record made by the spark cameras and illustrating differences in reference base line measurements.

Referring more particularly to the drawing, wherein similar reference characters designate corresponding parts throughout, there is shown a velocity testing apparatus 1 provided with a preferred embodiment of a chronograph apparatus 3 in accordance with the present invention.

The velocity testing apparatus 1 may comprise any suitable type of device adapted for measuring the velocity of a projected mass. For purpose of illustration, the apparatus shown in the drawing shows a projectile in the form of a mass or weight 5 attached to an explosive propellant-powered catapult 7. The mass 5 may, for example, represent the combined weight of an airplane occupant and the chair upon which he is seated. The mass 5 and catapult 7 are attached to a carriage 9 having rollers or wheels 11. The carriage 9 is mounted with its wheels 11 disposed upon a pair of guide rails 13 for controlling or limiting the trajectory or path of the projected mass.

The chronograph apparatus 3 comprises an electrically operated counter mechanism 15, two electrically operated recording devices 17, 19 and a switch mechanism 21 for effecting operation of the counter mechanism and the recording devices.

The counter mechanism 15 may be of any suitable kind having a plurality of independent electrical circuits operative to measure short intervals of time corresponding to the elapsed time for passage of a projectile over a limited portion of its trajectory or path. Operation of the counter depends upon interrupting one of the electrical circuits to initiate operation of the recording indicators and interrupting another one of the electrical circuits to terminate operation of the recording indicators.

Interruption of the respective counter electrical circuits may be effected by any suitable means such as the switch mechanism 21. The switch mechanism illustrated in the drawing is of the type more particularly shown and described in the copending application of N. K. Turnbull et al., Serial No. 288,992, filed concurrently herewith. Briefly, the switch 21 comprises at least three terminal members 23, 25, 27 and a circuit interrupting conductor 29. Two of the terminals 23, 25 are individually connected with separate ones of the electrical counter circuits through single conductors 31, 33 and the third terminal 27 is connected with both counter circuits through a common source of ground potential 35. The circuit interrupting conductor 29 is adapted for attachment to the mass 5 and is arranged in contact with each of the terminals 23, 25, 27 when the chronograph apparatus 3 is conditioned for operation. In operation, upon firing the projectile 5, the circuit interrupting conductor 29 is slidably withdrawn from contact with the terminals thereby breaking the connection between the terminals 27 connected with the source of ground potential 35 and each of the other terminals 23, 25, in turn to successively interrupt the counter circuits.

For the purpose of determining minor differences in length of the reference base line occasioned by irregularities in circuit interruption occurring in the switch mechanism 21, the recording devices 17, 19 are provided. These devices preferably comprise two spark cameras or other electrically operated flash producing means which are disposed at predetermined spaced intervals along the trajectory or path of the projectile 5. The spark cameras 17, 19 are electrical devices of any suitable type which are operative in response to interruption of an electrical circuit. The cameras are connected electrically in circuit with the switch mechanism 21 for simultaneous operation with the counter circuits. In other words, the spark camera 17 disposed first along the path of the projectile 5 is connected electrically with the circuit for initiating operation of the counter mechanism 15 and the spark camera 19 disposed second along the path of the projectile is connected with the circuit for terminating operation of the counter mechanism.

Included as part of the spark camera measuring apparatus is a gauge bar 37 which is also disposed along the path of the projectile. In the particular apparatus shown, the gauge bar 37 is attached to the guide rail 13 adjacent to and opposite the spark cameras 17, 19. Two ferrules 39, 41 are mounted in apertures 43 provided in the gauge bar 37 opposite the spark cameras. Each of the ferrules 39, 41 comprises a tubular member having one end 45 thereof substantially closed. A narrow slot 47 is provided in the closed end of each ferrule the function of which is to permit the transmission of a pattern of light therethrough.

As shown particularly in Fig. 2 of the drawing, the ferrules 39, 41 are oriented with their slots 47 in different positions so as to transmit discrete patterns of light for recording. In other words, the ferrule 39 mounted opposite the first camera located along the path of the projectile will transmit a vertical pattern of light, and the other ferrule 41 will transmit a horizontal light pattern. Any means, such as the set screws 49 in the gauge bar, may be provided for holding the ferrules in an adjusted position.

The ferrules 39, 41 are arranged with the centers of the end openings 47 disposed apart a predetermined distance constituting a reference base line and the switch terminals 23, 25 connected individually with separate ones of the spark cameras 17, 19 are disposed apart a distance corresponding to the length of the reference base line.

Included also as part of the spark camera measuring apparatus is a photosensitive record member 51 mounted on a suitable support 53 attached to the carriage 9. The record member 51 comprises a rectangular sheet of photographic paper or other member sensitive to the action of light. The record member is arranged with its longitudinal axis disposed in a horizontal position and for movement past the ferrules 39, 41.

The circuit interrupting conductor 29 of the switch mechanism 21 comprises a wire having one end thereof attached by any suitable means to the carriage 9 so that it is responsive to firing of the projectile and will interrupt the chronograph circuits as it is withdrawn from contact with the switch terminals 23, 25. The wire should be of a length sufficient to extend from the carriage through the switch mechanism 21 and terminate so that the free end 55 thereof will break contact with the first terminal 23 of the switch connected with the circuit for initiating operation of the counter 15 and for operating the first spark camera 17 as the photosensitive record member 51 reaches a point opposite the first spark camera ferrule 39. Accordingly, the free end of the wire will then break contact with the second switch terminal 25 connected with the circuit for terminating operation of the counter and for operating the second spark camera 19 as the record member reaches a point opposite the second spark camera ferrule 41.

In accordance with the foregoing arrangement, the switch mechanism 21 will be found to successively interrupt the chronograph circuits and simultaneously record intervals of time and distance. In other words, simultaneous with initiating operation of the timing mechanism 15, the first spark camera 17 will flash and record a vertical light pattern 56 on the photosensitive record member 51. Likewise, simultaneous with terminating operation of the timing mechanism, the second spark camera 19 will flash and record a horizontal light pattern 57 on the record member.

The relative positions of the discrete records made by the spark cameras on the photosensitive record member are used in determining the exact measurement of the reference base line for the interval of time recorded between interruption of the first chronograph circuit and interruption of the second circuit. In other words, the counter mechanism 15 is operative to record the interval of time elapsing between the point at which a break occurs in the circuit associated with the first switch terminal 23 and the point at which a break occurs in the circuit associated with the second switch terminal 25. Presumably, if the break in the circuits occurred at precisely the same point each time, the distance between the points at which the chronograph circuits are broken would always be the same. This would be a known factor and constant for each velocity measurement made. However, it will become apparent to those persons skilled in the art, that the point at which the wire conductor 29 breaks contact with each terminal of the switch will not always be the same. These differences over the predetermined reference base line established by the distances the ferrule slots 45 and the terminals 23, 25 are set apart are reflected on the photosensitive record member 51. Thus, the predetermined length of the reference base line between the ferrules serves as a master or standard measurement for purposes of comparison with the exact distance between the actual points of circuit interruption as determined with each test made.

As shown in Fig. 5 of the drawing, if breaks in the respective chronograph circuits occur at points exactly the same distance apart as the length of the reference base line, the discrete patterns will be recorded with their centers superimposed, as shown by the solid black vertical 56 and solid black horizontal 57 patterns. If, however, the distance between points at which the circuit breaks occur is greater than the length of the reference base line, the centers of the patterns will be offset with respect to each other, as shown by the horizontal pattern 57 and the broken line vertical pattern 59. On the other hand, if the distance between points at which the circuit breaks occur is less than the length of the reference base line, the centers of the patterns will also be offset with respect to each other, but as shown by the horizontal pattern 57 and the broken line vertical pattern 61. Differences in offset of the respective pattern centers will reflect the differences in base line measurement over the reference base line and the exact distance measurement may thus be obtained for the particular interval of time elapsed and recorded by the counter mechanism occasioned by breaks in the chronograph circuits.

Although the arrangement illustrated in the drawing does not show how the photosensitive record member is shielded from flashes of light from the spark cameras or from ambient light, this is recognized as a mechanical expedient and not a part of the present invention.

From the foregoing description, it will become apparent to those persons skilled in the art that the present invention provides a velocity measuring device useful in obtaining accurate measurements of both time and distance with respect to a projectile in flight.

Although there is shown and described but a single embodiment of the present invention, various other modifications and changes within the spirit of the present invention will, no doubt, readily suggest themselves to those skilled in the art. For example, the patterns for making discrete records on the photosensitive record member may be arranged differently or other patterns substituted. Therefore, it is desired that the above description shall be considered merely as illustrative and not as limiting.

We claim:

1. A chronograph system for determining the velocity of a projected mass comprising a plurality of electrically operated flash producing means disposed along the path of projection of said mass, said flash producing means being disposed apart a predetermined distance constituting a reference base line, an electrically operated counter mechanism, photosensitive record means carried by said mass and being arranged for movement past said flash producing means, and switch means connected electrically in circuit with said flash producing means and said counter mechanism, said switch means including circuit interrupting means carried by said mass and being operatively connected for response to movement of said mass along its path of projection to interrupt the respective electrical circuits connected with said flash producing means and said counter mechanism thereby to effect simultaneous operation of respective ones of said flash producing means and said counter mechanism, whereby said counter will record the elapsed time of said mass in its movement along said base line and said flash producing means will record accurately on said photosensitive record means the distance travelled by said mass during said elapsed time period.

2. The invention as defined in claim 1 wherein said switch means includes a plurality of terminal members, at least two of said members being disposed apart a distance corresponding to said reference base line, separate ones of said flash producing means together with said counter mechanism being connected electrically and independently with separate ones of said two terminal members, said interrupting means being connected electrically in circuit with said two terminal members and a third one of said terminal members.

3. The invention as defined in claim 2 wherein said photosensitive record means is arranged to move successively past first and second ones of said flash producing means disposed respectively at opposite ends of said reference base line, and wherein said circuit interrupting means is arranged responsive to interrupt the electrical circuit associated with a first one of said two terminal members thereby to simultaneously operate said first flash producing means and initiate operation of said counter mechanism upon said photosensitive record means being disposed opposite said first flash producing means, and wherein said circuit interrupting means is further arranged responsive to interrupt the electrical circuit associated with a second one of said two terminal members thereby to simultaneously operate said second flash producing means and terminate operation of said counter mechanism upon said photosensitive record means being disposed opposite said second flash producing means.

4. The invention as defined in claim 3 wherein each of said flash producing means includes apertured means for producing discrete patterns on said photosensitive record means.

5. A chronograph system for determining the velocity of a projected mass comprising a plurality of electrically and independently operated flash producing means disposed apart a predetermined distance constituting a reference base line along the path of projection of said mass, a counter mechanism having a plurality of independent electrical circuits, switch means including a plurality of terminal members disposed apart a distance corresponding to the length of said reference base line, separate ones of said terminal members being connected electrically in circuit with separate ones of said flash producing means and separate ones of said counter electrical circuits, and photosensitive record means carried by said mass and arranged for movement past each of said flash producing means, said flash producing means and said counter mechanism being operative upon interruption of the electrical circuits associated therewith, said switch means including circuit interrupting means carried by said mass and connected electrically with said terminal members, said circuit interrupting means being operative in response to movement of said mass along its projected path to successively interrupt said electrical circuits and effect simultaneous operation of respective ones of said flash producing means and said counter mechanism.

6. The invention as defined in claim 5 wherein said terminal members comprise first and second terminal members, and wherein said counter mechanism electrical circuits comprise a first circuit for initiating operation of said counter mechanism and a second circuit for terminating operation of said counter mechanism, said first terminal member being connected electrically with a first one of said flash producing means encountered by said photosensitive record means and also being connected electrically with the first of said counter mechanism circuits, and said second terminal member being connected electrically with the second one of said flash producing means encountered by said photosensitive record means and also being connected electrically with the second of said counter mechanism circuits.

7. The invention as defined in claim 6 wherein said flash producing means includes means for producing discrete patterns on said photosensitive record means.

8. The invention as defined in claim 7 wherein said discrete pattern producing means comprises apertured members, the apertures of respective members being arranged to record discrete records on said photosensitive record means.

9. In a chronograph system for determining the velocity of a projected mass, the combination with a counter mechanism having a plurality of electrical circuits, at least one of said circuits being arranged to initiate operation of said counter mechanism, another of said circuits being arranged to terminate operation of said counter mechanism, of a plurality of flash cameras disposed apart a predetermined distance constituting a reference base line, said cameras being located along the path of projection of said mass, photosensitive record means carried by said mass and arranged for movement successively past said flash cameras, and switch means connected electrically with said circuits and said flash cameras, said switch means including circuit interrupting means carried by said mass and being arranged to initiate operation of said counter mechanism simultaneous with operation of a first one of said flash cameras encountered by said photosensitive record means upon movement of said mass sufficient to cause said circuit interrupting means to interrupt the electrical circuits associated therewith and said switch means also being arranged to terminate operation of said counter mechanism simultaneous with operation of a second one of said flash cameras encountered by said photosensitive record means upon further movement of said mass sufficient to cause said circuit interrupting means to interrupt the electrical circuits associated therewith.

10. In a chronograph system for determining the velocity of a projected mass, the combination with a counter mechanism having a plurality of electrical circuits, at least one of said circuits being arranged to initiate operation of said counter mechanism, another of said circuits being arranged to terminate operation of said counter mechanism, of a plurality of flash cameras disposed apart a predetermined distance constituting a reference base line, said cameras being located along the path of projection of said mass, photosensitive record means carried by said mass and arranged for movement successively past said flash cameras, and switch means comprising independent terminal members disposed apart a distance equal to the length of said reference base line, each of said terminal members being connected electrically in circuit with separate ones of said counter mechanism circuits and separate ones of said flash cameras, said switch means including circuit interrupting means carried by said mass and being arranged responsive to projection of said mass for successively interrupting the respective electrical circuits associated with said terminal members whereby to effect simultaneous operation of said flash cameras and said counter mechanism.

No references cited.